Sept. 27, 1927.
J. S. HALE
1,643,846
SPRAYING ATTACHMENT FOR PLOWS
Filed March 24, 1924
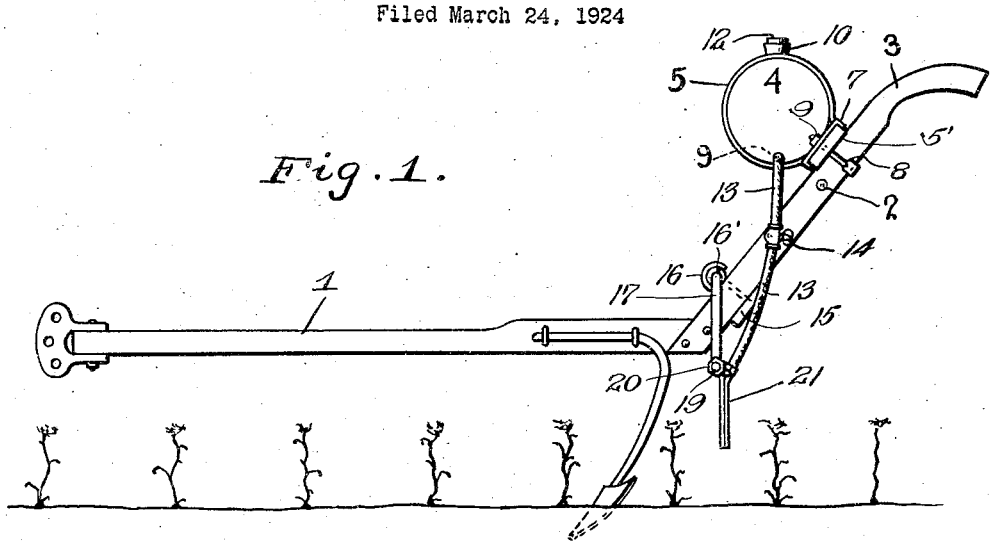
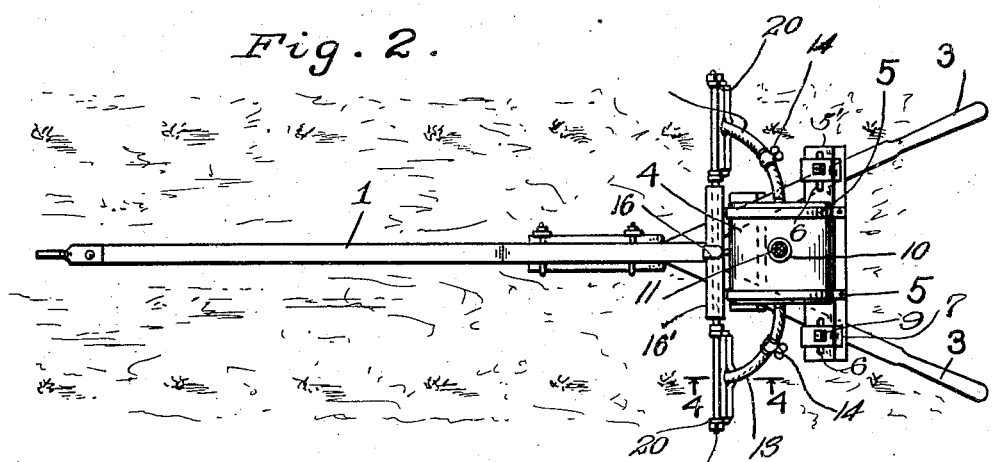
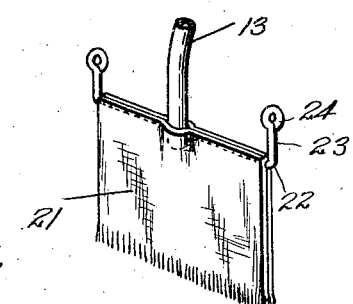
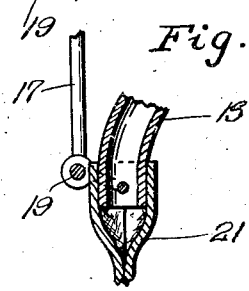
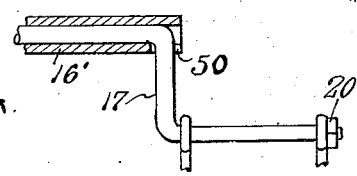
J. S. Hale
INVENTOR
BY *Victor J. Evans*
ATTORNEY Patented Sept. 27, 1927.

1,643,846

UNITED STATES PATENT OFFICE.

JAMES S. HALE, OF BARNESVILLE, GEORGIA.

SPRAYING ATTACHMENT FOR PLOWS.

Application filed March 24, 1924. Serial No. 701,549.

The object of this invention is to provide a cultivator with means for spraying plants at the sides of the furrow made by the cultivator shovel with a liquid insecticide, as well as brushing said plants to remove insects therefrom.

A further object is the production of a device of this character which may be readily attached to any ordinary hand cultivator, which may be adjusted thereon to act on plants of different sizes, which is cheap in construction and manufacture, and which will perform its functions with ease and with accuracy.

The accompanying drawing illustrates a satisfactory embodiment of the improvement reduced to practice, and wherein:—

Figure 1 is a side elevation illustrating the application of the improvement.

Figure 2 is a top plan view thereof.

Figure 3 is a perspective view of one of the wiper sheets.

Figure 4 is a detail sectional view on the line 4—4 of Figure 2.

Figure 5 is a detail view upon an enlarged scale to more clearly illustrate the notched end of the tube and the manner in which the crank member cooperates therewith.

In the drawing, I have illustrated my improvement in connection with an ordinary horse drawn handle controlled cultivator, which is broadly indicated by the numeral 1. Preferably opposite the brace bar 2 that spaces the handles 3 of the cultivator, I support a tank 4 that contains a liquid germicide. The tank is secured by straps 5 on a plate of wood or metal 5'. The plate 5' has elongated slots 6 adjacent to its ends. Arranged transversely over the slots are inverted U-shaped metal strips 7. Passing through the slots 6 and the strips 7 are the threaded shanks of hook members 8. The hooks engage the plow handles 3 and on their shanks are screwed nuts 9 which contact with the strips. By this arrangement the tank may be supported on the handles of different sized cultivators.

The tank has a cup-shaped neck 10 in which there is a screen 11 which strains the liquid poison as it is poured in tank. The neck is normally closed by a stopper 12.

The tank on its ends and at its bottom is provided with short pipes or nipples. To these nipples are connected outwardly and downwardly directed flexible pipes 13. When only one flexible pipe is employed one of the nipples is plugged, or the said nipples have their passages controlled by valves or drain cocks. The passages through the flexible pipes 13 are controlled by valves or drain cocks 14. Beneath the handles 3 at their connection with the cultivator beam there is a plate 15. Adjustably secured to this plate there is a hook 16 that extends upwardly between the handles 3 and engages a tube 16' that rests on the handles. The ends of the tube are notched or cut away longitudinally and transversely on one face thereof as at 50. Passing through the tube is the central straight portion of a crank member 17, which may be provided with collars or enlargements to prevent the same slipping through the tube. The angle arms of the crank member 17 are received in the notches at the ends of the tube, and contacting with the inner walls provided thereby will limit the swinging of the said crank member.

The arms of the crank member 17 terminate in outwardly extending spindle portions 19 provided with spaced sleeves or enlargements 20. Fixedly secured on the spindles are the wiper elements 21. The wipers are of textile material of any desired character and preferably comprise inner and outer layers connected at their ends and tops. The outer ends of the flexible pipes 13 are received in the center of the top edges of the wipers.

Passing through the top of each wiper member 21 is a rod 22. Each rod has angle ends 23 which terminate in eyes 24. These eyes are received on the spindle ends of the crank member between the collars or enlargements 20. The hose embody an inherent resiliency, sufficient to normally sustain the wiper members and the crank support therefor in one position, so that the arms of the crank will contact with the lower shoulders provided by the notch 50 in the ends of the tube 16'.

The liquid germicide, flowing through the hose from the tank 4 will be delivered upon the fabric sheets so that these sheets will be thoroughly impregnated with the insect destroying fluid. The sheets are arranged for wiping contact with growing plants, as illustrated in Figures 1 and 2 of the drawing, so that the germicide will be delivered on to the plants between the furrow made by the cultivator shovel, the wiping fabric also serving as beaters for removing insects from the plants.

Having described the invention, I claim:—

An attachment for plows, for the purpose set forth, comprising a receptacle, means for adjustably securing the receptacle on the handles of a plow, a tube having notched ends fixed on the handle below the receptacle, a crank member having its central portion journaled in the tube and its angle arms received in the notched ends of said tube, and whereby the swinging of the crank member is limited by the contact thereof with the shoulders provided by the notches, a laterally extending fabric wiper fixed on and extending outwardly from the ends of the crank member, and valve controlled flexible tubes communicating with the tank and with the wiper members and said tubes normally holding the wiper and crank members in one position.

In testimony whereof I affix my signature.

JAMES S. HALE.